US012555317B2

(12) United States Patent
Hwang

(10) Patent No.: US 12,555,317 B2
(45) Date of Patent: Feb. 17, 2026

(54) METHOD FOR PROVIDING EXTENDED REALITY SOLUTION BASED ON DISPLAY DEVICE FOR MAKING IMMERSIVE CONTENT AND APPARATUS USING THE SAME

(71) Applicant: SOULX CO., LTD., Seoul (KR)

(72) Inventor: Youngtaeck Hwang, Seoul (KR)

(73) Assignee: SOULX CO., LTD., Seoul (KR)

( * ) Notice: Subject to any disclaimer, the term of this patent is extended or adjusted under 35 U.S.C. 154(b) by 138 days.

(21) Appl. No.: 18/533,336

(22) Filed: Dec. 8, 2023

(65) Prior Publication Data

US 2025/0118016 A1 Apr. 10, 2025

(30) Foreign Application Priority Data

Oct. 10, 2023 (KR) ........................ 10-2023-0134466

(51) Int. Cl.
*G06T 17/00* (2006.01)
*G06T 5/50* (2006.01)
*G06T 7/62* (2017.01)
*G06V 10/25* (2022.01)

(52) U.S. Cl.
CPC ................ *G06T 17/00* (2013.01); *G06T 5/50* (2013.01); *G06T 7/62* (2017.01); *G06V 10/25* (2022.01); *G06T 2207/20132* (2013.01); *G06T 2207/20221* (2013.01); *G06V 2201/07* (2022.01)

(58) Field of Classification Search
None
See application file for complete search history.

(56) References Cited

U.S. PATENT DOCUMENTS

2012/0257787 A1* 10/2012 Ogasawara ............. A63F 13/42
382/103
2023/0188693 A1* 6/2023 Thurston, III ....... H04N 13/204
348/42

FOREIGN PATENT DOCUMENTS

WO WO-2024068743 A1 * 4/2024 ............... G09G 3/32

* cited by examiner

*Primary Examiner* — Saptarshi Mazumder
(74) *Attorney, Agent, or Firm* — The PL Law Group, PLLC

(57) ABSTRACT

In a method of providing an extended Reality (XR)-based composite image according to an embodiment, a planar image is received by a computing device from a camera photographing a display device, and the received planar image and a virtual space image are composited by the computing device, and a final image is output.

7 Claims, 9 Drawing Sheets

METHOD FOR PROVIDING EXTENDED REALITY SOLUTION BASED ON DISPLAY DEVICE FOR MAKING IMMERSIVE CONTENT AND APPARATUS USING THE SAME

CROSS-REFERENCE TO RELATED APPLICATION AND CLAIM OF PRIORITY

This application claims the benefit under 35 USC § 119 of Korean Patent Application No. 10-2023-0134466, filed on Oct. 10, 2023, in the Korean Intellectual Property Office, the entire disclosure of which is incorporated herein by reference for all purposes.

BACKGROUND

1. Technical Field

The present disclosure relates to a method of providing an extended Reality (XR)-based composite image and an apparatus using the same, and more specifically, a method of providing an XR-based composite image including receiving, by a computing device, a planar image from a camera photographing a display device, and compositing, by the computing device, the received planar image and a virtual space image, and outputting a final image.

2. Background Art

In general, the Chroma Key compositing method has been used to output images for AR, VR, MR, XR, and the same. The Chroma Key compositing method has many disadvantages, such as blowing out certain color schemes, limiting costumes and making pupils disappear, and making it difficult for performers to feel a sense of realism against a chroma background.

In addition, the Chroma Key compositing method suffers has a problem regarding surface reflections and light effects. If the subject is of a reflective material, it only reflects green, and since the Chroma Key is static, it requires post-processing with computer graphics to add light effects. In this case, there were problems in that there were too many parts to process, the use of reflective materials was limited, and it looked unnatural even after post-processing.

To solve the above tasks, the inventor of the present disclosure proposes a method for providing an XR-based composite image and an apparatus using the same.

SUMMARY

The present disclosure may have the following objectives.

An object of the present disclosure is to enable the public to easily transmit expensive solutions and XR contents centered on companies with large funds and specific organizations using various mass media such as YouTube and TikTok.

An object of the present disclosure is to allow costumes, hair color, and the same of performers to be freely changed even if a specific color scheme is used.

Furthermore, it is an object of the present disclosure to eliminate the constraints of age, space, weather, time, and the same, and to allow backgrounds to be freely chosen.

It is also an object of the present disclosure to create visually rich images by adjusting light effects and surface reflections.

According to an example embodiment of the present disclosure, a method of providing an extended Reality (XR)-based composite image includes receiving, by a computing device, a planar image from a camera photographing a display device, and compositing, by the computing device, the received planar image and a virtual space image, and outputting a final image.

In addition, according to an example embodiment of the present disclosure, the camera photographs the display device corresponding to an LED Wall and a subject positioned in front of the display device.

In addition, according to an example embodiment of the present disclosure, a distance between the camera and the display device is determined based on the resolution of the display device.

In addition, according to an example embodiment of the present disclosure, in a state where a virtual camera photographing a virtual space is set, the received planar image is arranged in a direction facing the virtual camera.

In addition, according to an example embodiment of the present disclosure, the computing device matches coordinates of the planar image with coordinates of the virtual space.

In addition, according to an example embodiment of the present disclosure, the computing device crops a second area from the planar image, excluding a first area corresponding to a space in which the subject is located and a movement space in which the subject is to move, and provides a final image generated by compositing the first area with the virtual space image.

In addition, according to an example embodiment of the present disclosure, the size of the first area to be composited varies based on the size of the subject and the size of the movement space.

In addition, according to an example embodiment of the present disclosure, the periphery of the first area is blurred.

In addition, according to an example embodiment of the present disclosure, a device for providing an extended Reality (XR)-based composite image includes a communication unit that receives a planar image from a camera photographing a display device, and a processor that composites the received planar image and a virtual space image, and outputs a final image.

In addition, according to an example embodiment of the present disclosure, the camera photographs the display device corresponding to an LED Wall and a subject positioned in front of the display device.

In addition, according to an example embodiment of the present disclosure, a distance between the camera and the display device is determined based on the resolution of the display device.

In addition, according to an example embodiment of the present disclosure, in a state where a virtual camera photographing a virtual space is set, the received planar image is arranged in a direction facing the virtual camera.

In addition, according to an example embodiment of the present disclosure, the processor matches coordinates of the planar image with coordinates of the virtual space.

In addition, according to an example embodiment of the present disclosure, the processor crops a second area from the planar image, excluding a first area corresponding to a space in which the subject is located and a movement space in which the subject is to move, and provides a final image generated by compositing the first area with the virtual space image.

In addition, according to an example embodiment of the present disclosure, the size of the first area to be composited varies based on the size of the subject and the size of the movement space.

In addition, according to an example embodiment of the present disclosure, the periphery of the first area is blurred.

In addition, according to an example embodiment of the present disclosure, a computer program stored on a computer-readable recording medium is coupled to a computing device to perform the method of providing the extended Reality (XR)-based composite image.

In addition, according to an example embodiment of the present disclosure, a system for providing an extended Reality (XR)-based composite image includes a display device, a camera photographing the display device, and a computing device, in which the computing device is configured to receive a planar image from the camera through a communication unit, and composite the received planar image and a virtual space image and output a final image.

According to the present disclosure, the following effects are produced.

According to the present disclosure, it is possible to detect moving objects in real time using radar data and camera data that may be complementary.

In addition, according to the present disclosure, it is possible to transmit different radar data and camera data using one IP (LAN) and two ports.

Furthermore, according to the present disclosure, it is possible to accurately detect moving objects even when there are obstacles or it is nighttime.

DETAILED DESCRIPTION

Figure 1:
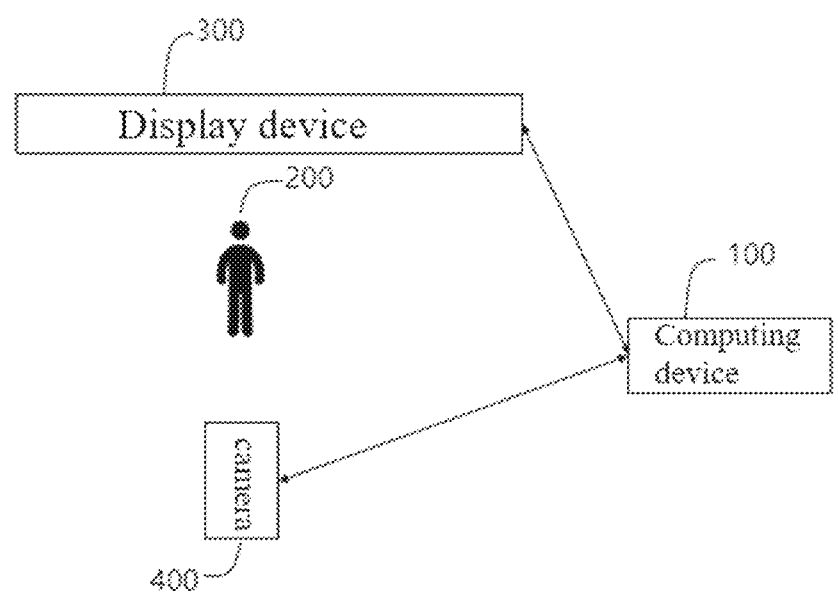
FIG. 1 is a schematic block diagram of a structure of a composite image system according to an example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. Also, it is to be understood that the positions or arrangements of individual elements in the embodiment may be changed without separating the spirit and scope of the present disclosure. The following detailed description is, therefore, not to be taken in a limiting sense, and the scope of the present disclosure is defined only by the appended claims that should be appropriately interpreted along with the full range of equivalents to which the claims are entitled. In the drawings, like reference numerals identify like or similar elements or functions through the several views.

Hereinafter, preferred embodiments of the present disclosure will be explained in detail with reference to the accompanying drawing so that those skilled in the art may easily practice the present disclosure.

FIG. 1 is a schematic block diagram of a structure of a composite image system according to an example embodiment of the present disclosure.

An object of the present disclosure is to provide an extended Reality (XR)-based composite image, wherein a composite image system 1 may include a computing device 100, a display device 300, and a camera 400 that photographs the display device. Further, a subject 200 may be present in front of the display device 300.

Here, there may be a plurality of cameras 400, which may photograph one or more of the subjects 200 from different angles. Furthermore, the cameras 400 may include any device capable of taking photographs, such as a mobile device equipped with a camera function.

Figure 2:
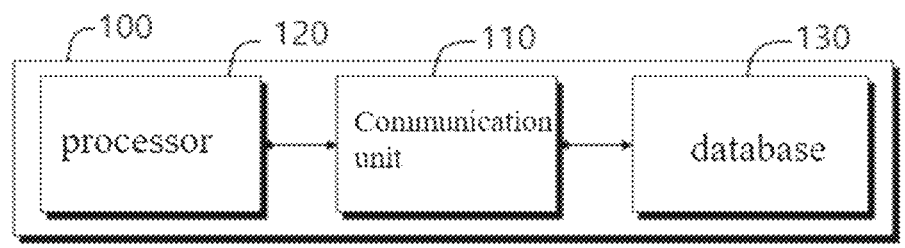
FIG. 2 is a schematic block diagram of a structure of a computing device according to an example embodiment of the present disclosure.

FIG. 2 is a schematic block diagram of a structure of a computing device according to an example embodiment of the present disclosure.

As illustrated in FIG. 2, the computing device 100 of the present disclosure may include a communication unit 110, a processor 120, and a database 130.

Here, the communication unit may be implemented with a variety of communication technologies. For example, Wi-Fi (WIFI), Wideband CDMA (WCDMA), High Speed Downlink Packet Access (HSDPA), High Speed Uplink Packet Access (HSUPA), High Speed Packet Access (HSPA), Mobile WiMAX, WiBro, Long Term Evolution (LTE), 5G, 6G, bluetooth, infrared data association (IrDA), near field communication (NFC), Zigbee, or WLAN technologies may be applied. In addition, if the service is provided while connected to the Internet, it may follow TCP/IP, the standard protocol for transmitting information on the Internet.

Figure 3:
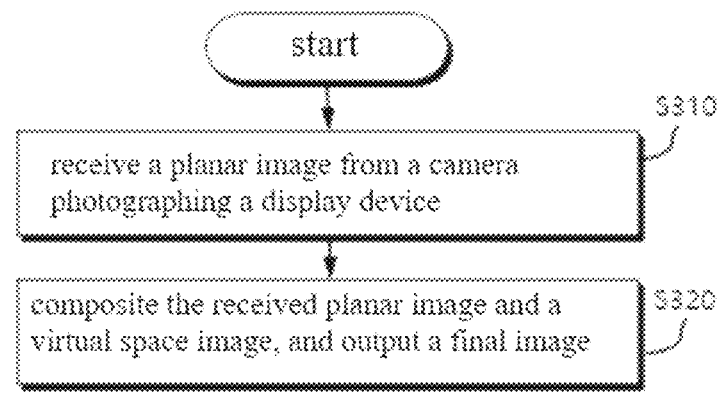
FIG. 3 is a diagram illustrating the process until the final image is output according to an example embodiment of the present disclosure.

FIG. 3 is a diagram illustrating the process until the final image is output according to an example embodiment of the present disclosure.

Figure 4:
FIG. 4 is a diagram illustrating an example of a selectable virtual space and display screen according to an example embodiment of the present disclosure.

FIG. 4 is a diagram illustrating an example of a selectable virtual space and display screen according to an example embodiment of the present disclosure.

First, as shown in FIG. 1, a camera 400 may photograph a display device 300 and a subject 200 positioned in front of the display device 300. The display device 300 may correspond to an LED wall having a resolution of at least 2K, and may display various images.

The processor 120 of the computing device 100 may allow the user to select any one of a plurality of wallpapers (see FIG. 4), and the selected screen may be output via the display device 300. The wallpaper may include 2D as well as 3D images. A virtual space, as will be described later, may also be set by user selection.

In addition, the processor 120 may allow the user to freely set different ages, spaces, weather, times, and the same, and display different screens.

The subject 200, who is a performer (person), may act and be photographed while feeling a higher sense of realism through the wallpaper displayed on the display device 300.

In addition, since the planar image and virtual space display the same wallpaper, post-processing work is significantly reduced compared to traditional methods, and productivity may also be improved.

Natural compositing and maintaining a sense of reality may also improve the quality of the final image, delivering higher-quality content to viewers, and these effects may be used to create innovative results in a variety of fields.

Figure 5:
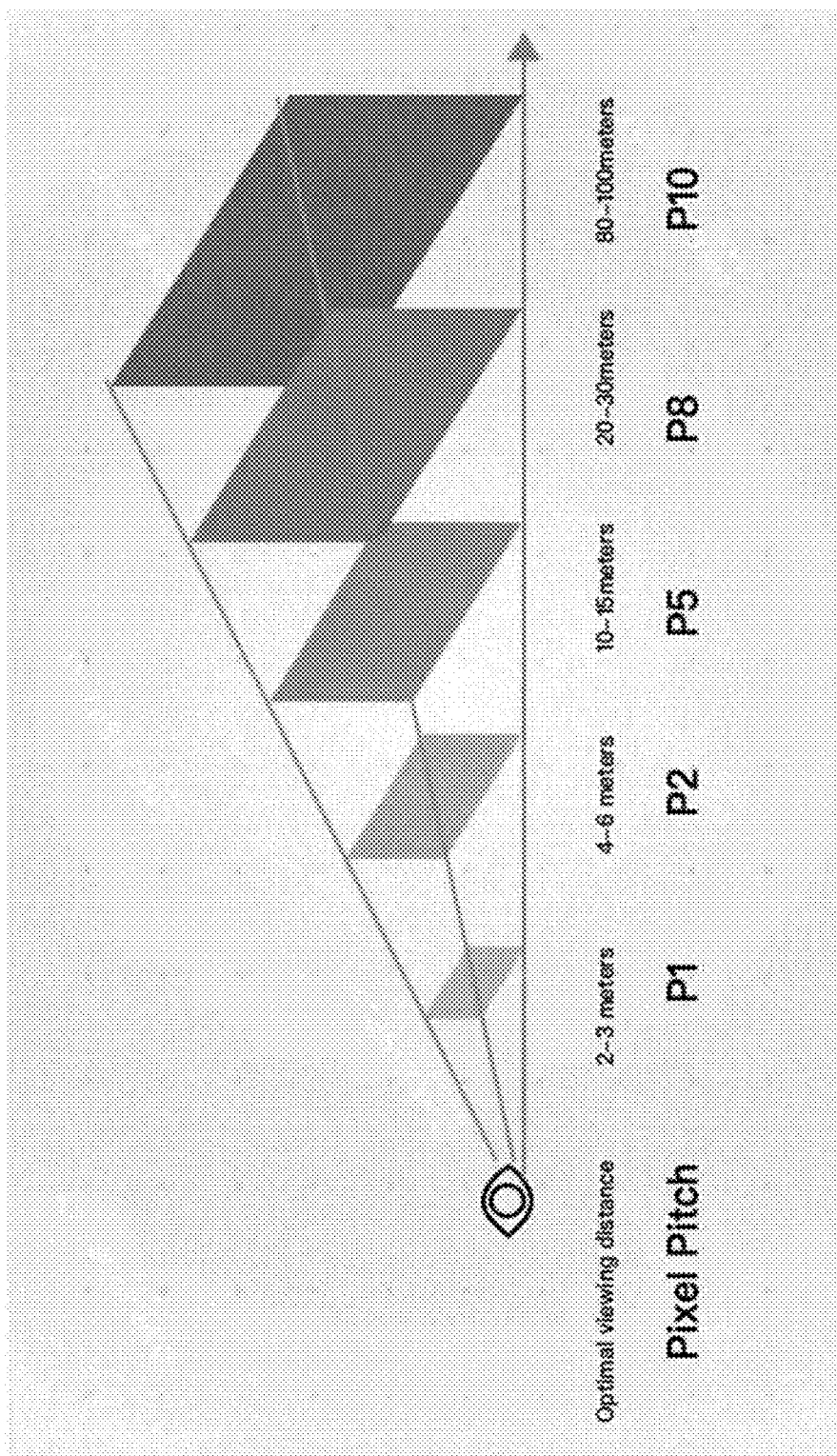
FIG. 5 is a diagram illustrating a distance between a camera and a display device according to an example embodiment of the present disclosure.

FIG. 5 is a diagram illustrating a distance between a camera and a display device according to an example embodiment of the present disclosure.

Further, the distance between the display device 300 (or subject 200) and the camera 400 may be determined based on the resolution or pixel pitch of the display device 300.

As shown in FIG. 5, the wider the spacing of the display device 300's pixel pitch (distance between LED pixels) or the lower the resolution, the greater the distance between the display device 300 and the camera 400 may be. This is because at lower resolutions (with wider pixel pitch spacing), a longer distance is required to capture natural-looking images.

For example, if the pixel pitch is P2 (e.g. LED pixels are 2 mm apart), the distance between the display device 300 and the camera 400 is 4-6 meters, and if the pixel pitch is P10 (e.g. LED pixels are 10 mm apart), the distance between the display device 300 and the camera 400 may be 80-100 meters.

In operation S310, the processor 120 of the computing device 100 may receive a planar image from a camera 400 photographing the display device 300. That is, the processor 120 may receive a planar image of a wallpaper displayed on the display device 300 and a subject 200 positioned in front of it.

Here, the planar image corresponds to a size that may include both the current position of the subject 200 and the moving space of the subject 200, and may generally correspond to the screen size of the display device 300.

Figure 6:
FIG. 6 is a diagram illustrating a virtual space according to an example embodiment of the present disclosure.

FIG. 6 is a diagram illustrating a virtual space according to an example embodiment of the present disclosure.

Figure 7:
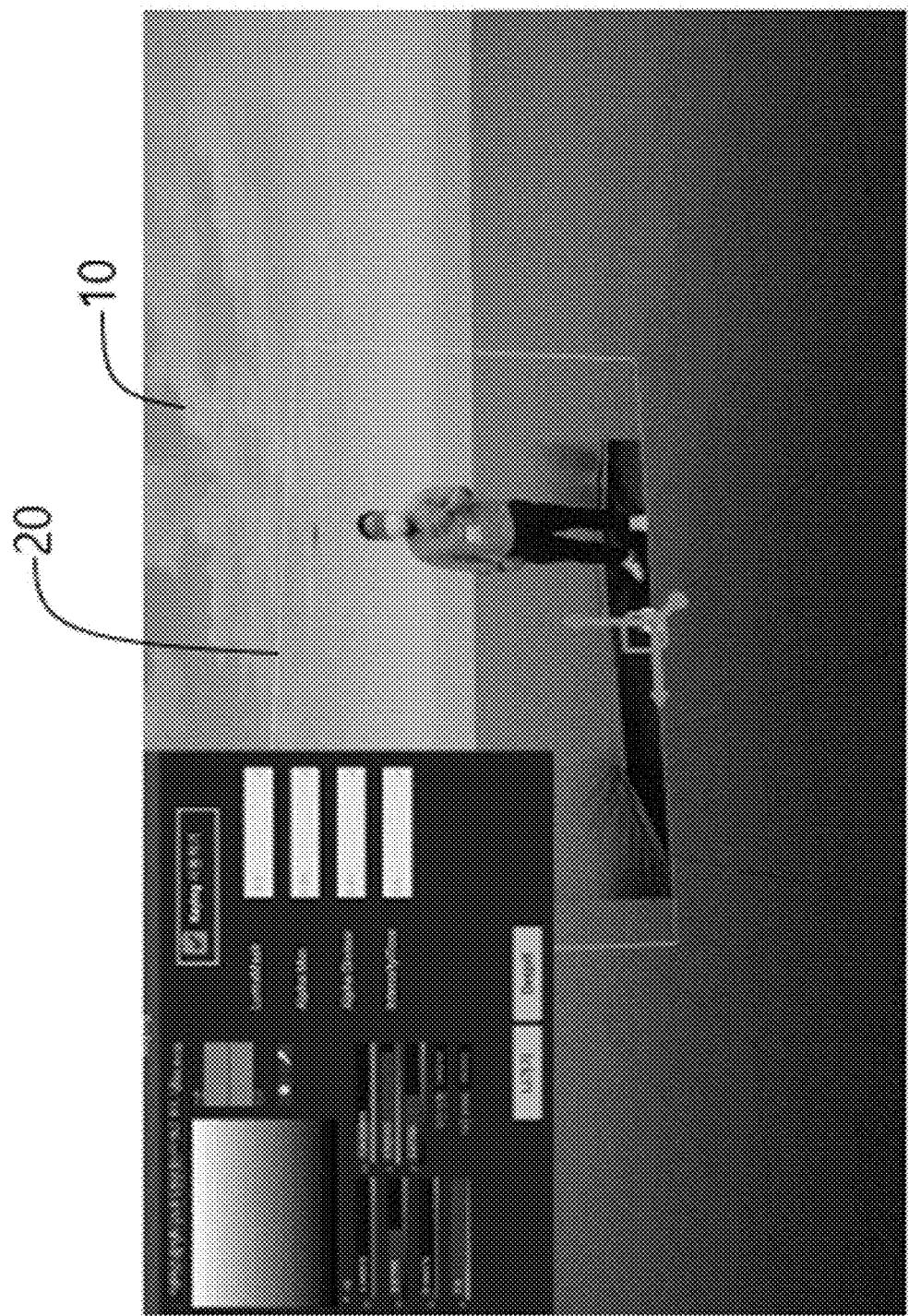
FIG. 7 is a diagram illustrating a planar image in virtual space according to an example embodiment of the present disclosure.

FIG. 7 is a diagram illustrating a planar image in virtual space according to an example embodiment of the present disclosure.

Figure 8B:
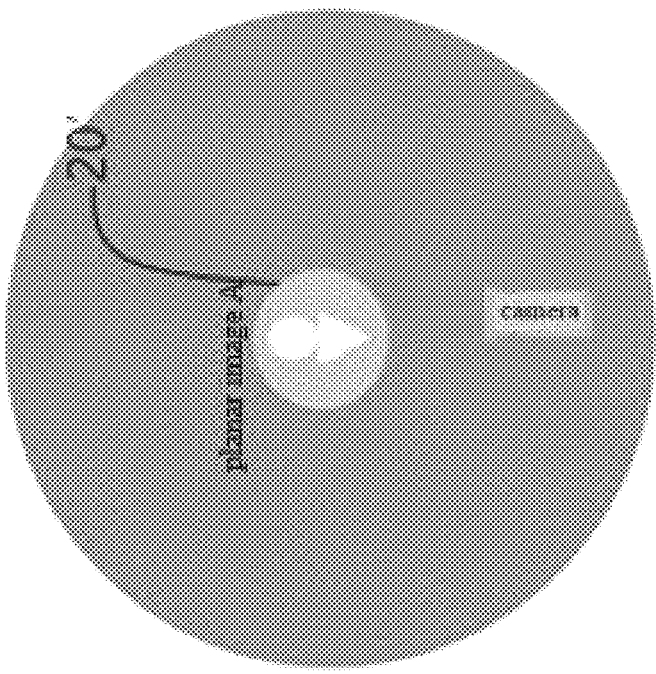
FIGS. 8A and 8B are a diagram illustrating the composition of a planar image and a virtual space image according to an example embodiment of the present disclosure.
Figure 8A:
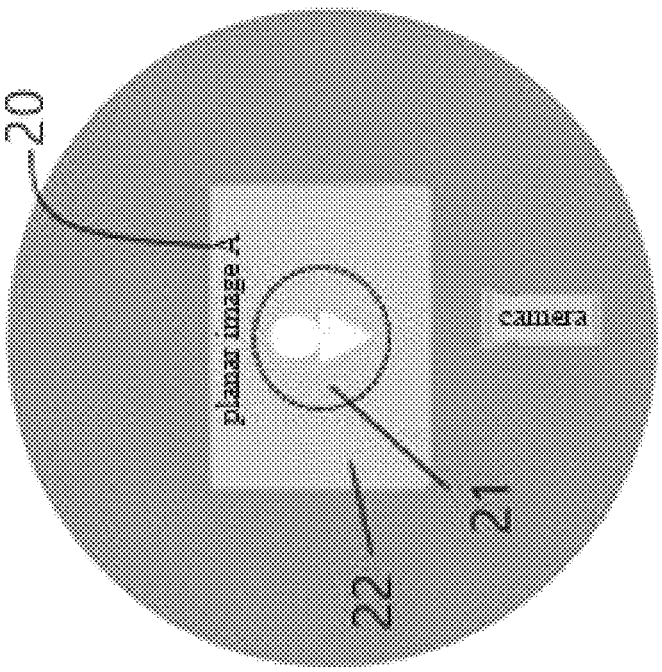

FIGS. 8A and 8B are a diagram illustrating the composition of a planar image and a virtual space image according to an example embodiment of the present disclosure.

In operation S320, the processor 120 of the computing device 100 may composite the received planar image and the virtual space image to output a final image.

Here, the virtual space may include various wallpapers selected by the user. The processor 120 provides editing tools for the user to edit the virtual space, and specifically, various objects (e.g., in the form of buildings, chairs, cars, etc.), textures (e.g., Brick, Steel, Concrete, Wood), visual effects (e.g., fireworks), and various light sources (e.g., light source position on the side, light source position on the top) that may decorate the virtual space may be provided as editing tools. For example, a ship object may be added to a background (virtual space) called the sea, and fireworks, etc. may be added.

Furthermore, in the present disclosure, the virtual space (3D) may be set to be photographed by a virtual camera, and the virtual camera may be set to be located and photograph at any position in the virtual space such as 2D, 3D, and the like. The virtual camera is distinct from a real camera 400, and by operating the virtual camera, the screen or the like on the virtual space being photographed may be changed.

Further, the processor 120 may position the received planar image in the direction in which the virtual camera is looking. In this case, the planar image may be disposed closer to the virtual space being photographed by the virtual camera, and of course, the location where the planar image is disposed may be determined by user selection.

As shown in FIG. 7, the planar image 20 may be positioned in front of the virtual space 10 relative to the virtual camera (viewing perspective).

Further, in the case of a plurality of cameras 400, the processor 120 may receive a plurality of planar images 20, and the plurality of planar images 20 may be displayed in real time on the virtual space 10, even in a composite image. The processor 120 may allow a user to select a particular camera and a particular planar image by displaying identifying marks for each of the plurality of cameras 400.

Furthermore, the processor 120 of the computing device 100 may match the coordinates of the planar image 20 and the coordinates of the virtual space 10. That is, the processor 120 may obtain a position (e.g. x-coordinate, y-coordinate, height h) at which the planar image 20 is disposed relative to the virtual space 10 from which the entire wallpaper is output, and may output a matching screen based on the position to the display device 300.

Here, the position at which the planar image 20 is disposed may be set based on the x, y coordinates of one of the points (e.g. center point, corner point) of the planar image 20 and the height (h) of the planar image 20. In some cases, the z-axis coordinate of one of the points rather than the height (h) may be a determining factor for the placement position.

Further, the processor 120 may crop a remaining second area 22 from the planar image, excluding a first area 21 corresponding to the space where the subject 200 is located and the movement space where the subject 200 will move, and composite only the first area 21 with the virtual space image 10 as the planar image 20' to generate and provide the final image.

Specifically, the subject 200 is movable, and a movable movement space may be preset based on an area of the planar image 20, and the area may be set as the first area 21. The remaining area excluding the first area 21 from the area of the planar image 20 output from the display device 300 may be referred to as the second area 22, and the processor 120 may remove the second area 22 by cropping, and composite only the first area 21 with the virtual space image Referring to FIG. 8A, the processor 120 may crop the remaining area 22, leaving only the first area 21 corresponding to the circular shape in the planar image 20, and output the final image by compositing the planar image 20' corresponding to the first area 21 with the virtual space image (see FIG. 8B).

The periphery of the first area 21 to be composited with the virtual space image may be blurred, so that the boundary between the virtual space image and the planar image 20' is natural.

Further, the size of the first area 21 to be composited may vary based on the size of the subject 200 and the size of the movement space. Specifically, the larger the size of the subject 200, the larger the area it occupies, and thus the larger the size of the first area 21 may be. The area occupied by the movement space may also be larger as the size of the subject 200 increases.

Further, according to an example embodiment of the present disclosure, the processor 120 of the computing device 100 may obtain identification information (e.g. ID, fingerprint, iris, etc.) of each of the plurality of subjects 200, and may pre-learn the individual movement space of each of the subjects 200, and may pre-store the area occupied based on the body shape (e.g. height) of the subject 200 in the database 130.

Additionally, when the processor 120 recognizes a particular subject, it may provide the first area 21 and the planar image with a size that is matched based on the learned movement space for the particular subject and the body shape of the particular subject via AI.

Figure 9:
FIG. 9 is a diagram illustrating a control box utilized for compositing a planar image in a virtual space according to an example embodiment of the present disclosure.

FIG. 9 is a diagram illustrating a control box utilized for compositing a planar image in a virtual space according to an example embodiment of the present disclosure.

According to an example embodiment of the present disclosure, the processor 120 may composite the planar image 20 disposed in the virtual space with the virtual space 10 and output a final image. In doing so, a control box may be utilized, as shown in FIG. 9. Here, the control box may include buttons for activating camera movement, selecting a crop area, selecting a blurring intensity, and the like.

Specifically, the processor 120 may allow the user to control the movement of the camera 400 via the camera movement activation button. That is, the movement of the camera 400 (up, down, left, right) may be controlled via a control box and may be activated/deactivated.

Further, the processor 120 may allow the user to select a rectangular area (Plane) or a circular area (Circle) when selecting the crop area (distinguishing between a first area and a second area).

That is, the processor 120 may select a mask of the remaining first area 21, excluding the second area 22 to be cropped from the planar image 20, as either a rectangle or a circle. Further, the processor 120 may adjust the position, size, and the like of the mask of the first area 21.

Further, the processor 120 may propose a shape, size, or the like of the first area 21 using artificial intelligence (AI) based on the subject 200's movement, shape, or the like. Specifically, the processor 120 may propose a circle shape as the shape of the first area 21 if the subject 200's movement (movement space) is below a predetermined area.

Further, the area occupied by the subject 200 may be calculated based on the area of the display device 300, and the size of the first area 21 may be automatically adjusted and proposed based on the ratio.

Further, the processor 120 may adjust the intensity of blurring (e.g. steps 1-10) for the first area 21 using AI. For example, if the planar image 20 and the virtual space 10 have the same background, the planar image 20 may be composited on the virtual space 10 while proceeding with blurring to a certain degree (e.g. step 2).

On the other hand, if the backgrounds of the planar image 20 and the virtual space 10 are different, the intensity of blurring may be set differently depending on whether the difference in color values at the boundary (e.g., RGB value at the virtual space boundary-RGB value at the planar image boundary) is below a certain value. In other words, the larger the difference, the greater the intensity of blurring.

In addition, for convenience in calculation, the average RGB value of the plurality of pixels on the planar image boundary and the average RGB value of the plurality of pixels on the virtual space boundary may be calculated respectively, and the difference between them may be calculated to determine the intensity of blurring.

Figure 10:
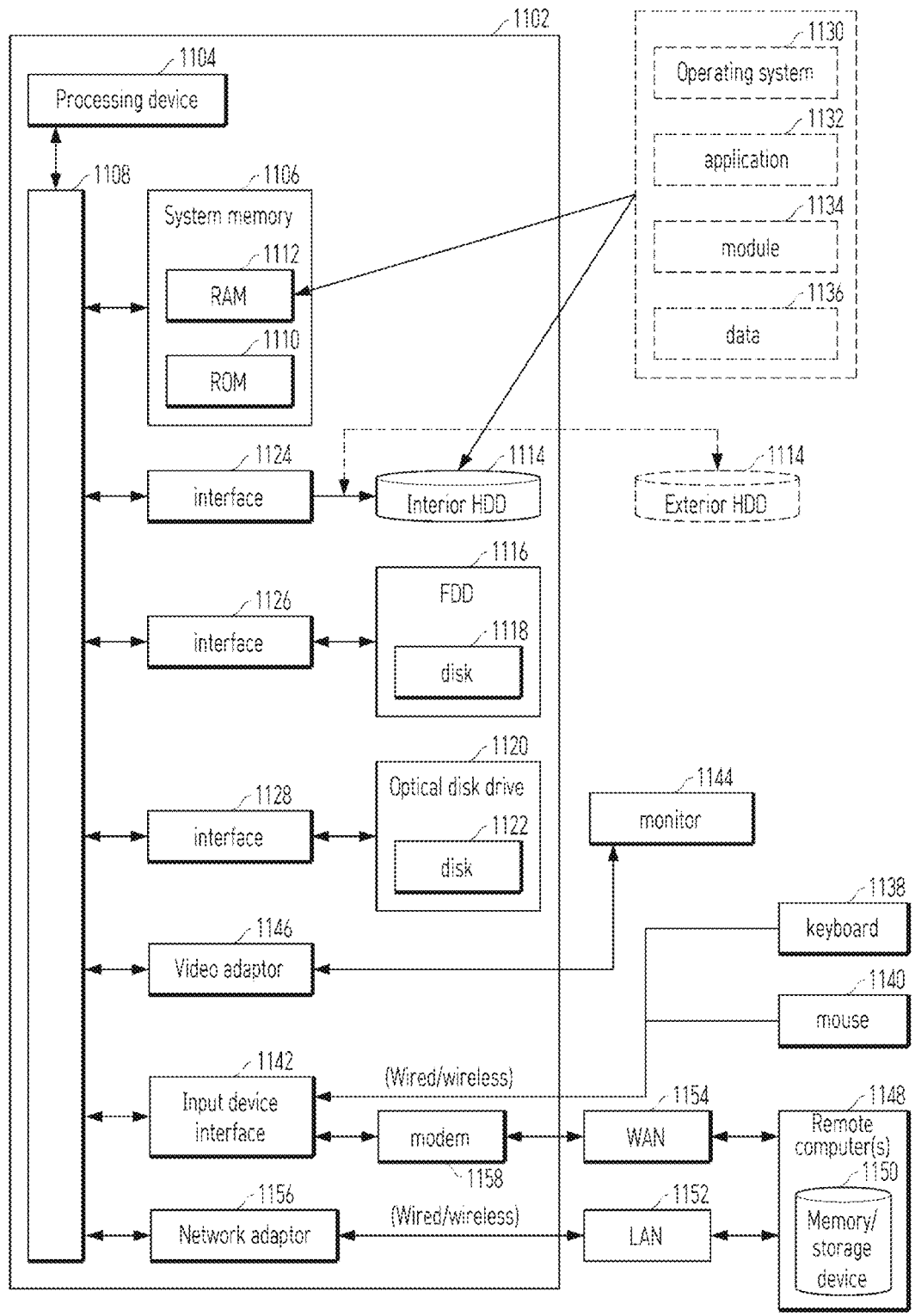
FIG. 10 is a normal and schematic view of a computing environment in which the embodiments of the present disclosure may be implemented.

FIG. 10 is a normal and schematic view of a computing environment in which the embodiments of the present disclosure may be implemented.

Those skilled in the art will well know that the example embodiments of the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure may be implemented by other computer system configurations including a personal computer, a handheld server, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary or non-temporary media, and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Additionally, various storage media described herein may represent one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be arranged within the scope of the present disclosure based on design priorities. The accompanying method claims provide various operations of elements in a sample order, but it does not mean that the claims are limited to the presented specific order or hierarchical structure.

The description of the presented example embodiments is provided so as for those skilled in the art to use or carry out the present disclosure. Various modifications of the example embodiments may be apparent to those skilled in the art, and general principles defined herein may be applied to other example embodiments without departing from the scope of the present disclosure. Accordingly, the present disclosure is not limited to the example embodiments suggested herein, and shall be interpreted within the broadest meaning range consistent to the principles and new characteristics suggested herein.

What is claimed is:

1. A method of providing an extended Reality (XR)-based composite image, the method comprising:
    receiving, by a computing device, a planar image from a camera photographing a display device; and
    compositing, by the computing device, the received planar image and a virtual space image, and outputting a final image,
    wherein, in a state where a virtual camera photographing a virtual space is set, the received planar image is arranged in a direction facing the virtual camera,
    wherein the computing device matches coordinates of the planar image with coordinates of the virtual space,
    wherein the computing device crops a second area from the planar image, excluding a first area corresponding to a space in which the subject is located and a movement space in which the subject is to move, and provides a final image generated by compositing the first area with the virtual space image,
    wherein the size of the first area to be composited varies based on the size of the subject and the size of the movement space,
    wherein the periphery of the first area is blurred,
    wherein a distance between the camera and the display device is determined based on a pixel pitch of the display device such that, for a pixel pitch of 2 mm, the distance is between 4 and 6 meters, and for a pixel pitch of 10 mm, the distance is between 80 and 100 meters.

2. The method of claim 1, wherein, in receiving the planar image, the camera photographs the display device corresponding to an LED Wall and a subject positioned in front of the display device.

3. The method of claim 2, wherein a distance between the camera and the display device is determined based on the resolution of the display device.

4. An apparatus for providing an extended Reality (XR)-based composite image, the apparatus comprising:
    a communication unit configured to receive a planar image from a camera photographing a display device; and
    a processor configured to composite the received planar image and a virtual space image, and output a final image,
    wherein, in a state where a virtual camera photographing a virtual space is set, the received planar image is arranged in a direction facing the virtual camera,
    wherein the computing device matches coordinates of the planar image with coordinates of the virtual space,
    wherein the computing device crops a second area from the planar image, excluding a first area corresponding to a space in which the subject is located and a movement space in which the subject is to move, and provides a final image generated by compositing the first area with the virtual space image, wherein the size of the first area to be composited varies based on the size of the subject and the size of the movement space, wherein the periphery of the first area is blurred, wherein a distance between the camera and the display device is determined based on a pixel pitch of the display device such that, for a pixel pitch of 2 mm, the distance is between 4 and 6 meters, and for a pixel pitch of 10 mm, the distance is between 80 and 100 meters.

5. The apparatus of claim 4, wherein the camera is configured to photograph the display device corresponding to an LED Wall and a subject positioned in front of the display device.

6. The apparatus of claim 5, wherein a distance between the camera and the display device is determined based on the resolution of the display device.

7. A non-transitory computer-readable recording medium storing a computer program, the computer-readable recording medium coupled to a computing device to perform the method of claim 1.

* * * * *